United States Patent [19]

Hayashi et al.

[11] Patent Number: 4,797,712
[45] Date of Patent: Jan. 10, 1989

[54] COLOR NEGATIVE INSPECTION APPARATUS

[75] Inventors: Ryoichi Hayashi, Tokyo; Kiichiro Sakamoto; Takaaki Terashita, both of Kanagawa, all of Japan

[73] Assignee: Fuji Photo Film Co., Ltd., Kanagawa, Japan

[21] Appl. No.: 61,612

[22] Filed: Jun. 12, 1987

[30] Foreign Application Priority Data

Jun. 13, 1986 [JP] Japan .................................. 61-137668

[51] Int. Cl.$^4$ ............................................. G03B 27/80
[52] U.S. Cl. ........................................ 355/38; 355/68; 355/77; 358/76
[58] Field of Search ............... 355/38, 68, 77; 358/76, 358/78, 80; 356/402

[56] References Cited

U.S. PATENT DOCUMENTS 4,364,044 12/1982 Akimoto .............................. 358/76
4,531,150 7/1985 Amano .
4,598,282 7/1986 Pugsley ............................ 358/76 X

FOREIGN PATENT DOCUMENTS 1578239 11/1980 United Kingdom .
2041691 3/1981 United Kingdom .
2070381 9/1981 United Kingdom .
2133657 7/1984 United Kingdom .

Primary Examiner—L. T. Hix
Assistant Examiner—D. Rutledge
Attorney, Agent, or Firm—Sughrue, Mion, Zinn, Macpeak, and Seas

[57] ABSTRACT

A color negative inspection apparatus includes at least one color image display device which displays a plurality of color positive images of a single frame of a color negative film for inspection, one of the plurality of color positive images being displayed through simulation for a standardized printing exposure condition of a printing apparatus to which the color negative film is fed upon printing and the remaining through automatic simulation for at least one of color and density corrections stepwise over or under in respect to the one of the plurality of color positive images. If there is no color positive images corrected suitably for printing, the one of the plurality of color images is manually corrected in color and density and thereby the remaining are correspondingly corrected for inspection.

10 Claims, 5 Drawing Sheets

COLOR NEGATIVE INSPECTION APPARATUS

BACKGROUND OF THE INVENTION

The present invention relates to a color negative inspection apparatus for displaying a negative image of a color negative film as different color positive images through simulation for color and density correction in order to determine printing exposure conditions.

An color printing apparatus incorporates therein an automatic exposure control system by which at least one characteristic value of a color negative image is measured to determine printing exposures for three colors; namely red, green and blue, by using an exposure calculation formula including the characteristic value for each color. Actually, exposure control values are calculated for the three colors in place of the printing exposures to automatically control three color components of printing light. Because of color negatives including various scenes, the automatic exposure system is not always suitable for all such color originals to make well-finished prints. For this reason, a color negative inspection apparatus is necessarily used prior to actual printing to correctively determine proper printing exposures on unusual negatives from which well-finished color prints can not be reproduced by the automatic exposure control system. The correction of exposure is usually effected based on the experiences of an operator prior to printing.

As color original inspection apparatus for determining proper printing exposures, there is heretofore well known in the art an apparatus which display on a CRT display screen a color positive image simulated as a finished print image for a standardized printing exposure condition from an negative image of an color original taken by a color TV camera. Because the conventional color original inspection apparatus can display an simulated image to be actually printed by a color printing apparatus prior to actual printing, an improved fraction defective of finished prints is possibly effected with the aid of the color original inspection apparatus. If in fact the operator determines that an color negative image being inspected is improper to make an well-finished print under the standardized printing condition while observing an color positive image simulated and displayed on the CRT screen, the operator enters correction values into the color negative inspection apparatus through function keys such as a color correction keys, color density correction keys and so forth so as to display a color positive image through simulation for the color correction and/or the density correction.

In general, different manufacturers supply color printing apparatus provided with different exposure control systems. For example, Japanese Patent Publication No. 59-13,011 teaches some of these exposure control systems; one of which controls exposures for three colors based on only a large area transmittance density (LATD); the other based on the difference between a LATD value and a gradation difference. Because the above-mentioned color original inspection apparatus is adapted to display an image through simulation for the LATD exposure control, it is not available for printing apparatus provided with exposure control systems different from the LATD exposure control system in order to display a properly simulated image on the CRT screen.

OBJECT OF THE INVENTION

It is therefore an object of the present invention to provide a color original inspection apparatus which can be used in connection with various types of printing apparatus provided with different exposure control systems.

It is another object of the present invention to provide a color original inspection apparatus by which the determination of printing exposure correction can be made quite easy.

SUMMARY OF THE INVENTION

These and other objects of the present invention are accomplished in preferred embodiments of the present invention by the provision of a means which provide a plurality of printing exposure control modes for defining different standardized printing exposure control conditions corresponding to of different exposure control systems of various color printing apparatus which are now available. The different printing exposure control modes are selectively used according to the types of printing apparatus to be used for the inspected color negatives. The color original inspection apparatus can display at least one color display means a plurality of color positive images as that are to be finished by the selected printing exposure control mode; one of the plurality of color positive images is displayed through simulation for the standardized printing exposure condition; the remaining through simulation for color correction and/or density correction differently corrected stepwise over or under the one of the plurality of color positive images.

According to the preferred embodiment of the present invention, the one of the plurality of color positive images simulated and displayed is further corrected in color and density by the manual operation of correction keys if there is no proper finished print on the display means, and correspondingly the remaining color positive image are automatically corrected in just the same way as the previous display.

DETAILED DESCRIPTION OF THE INVENTION

A preferred embodiment of the present invention will now be described with reference to the accompanying drawings.

Figure 1:
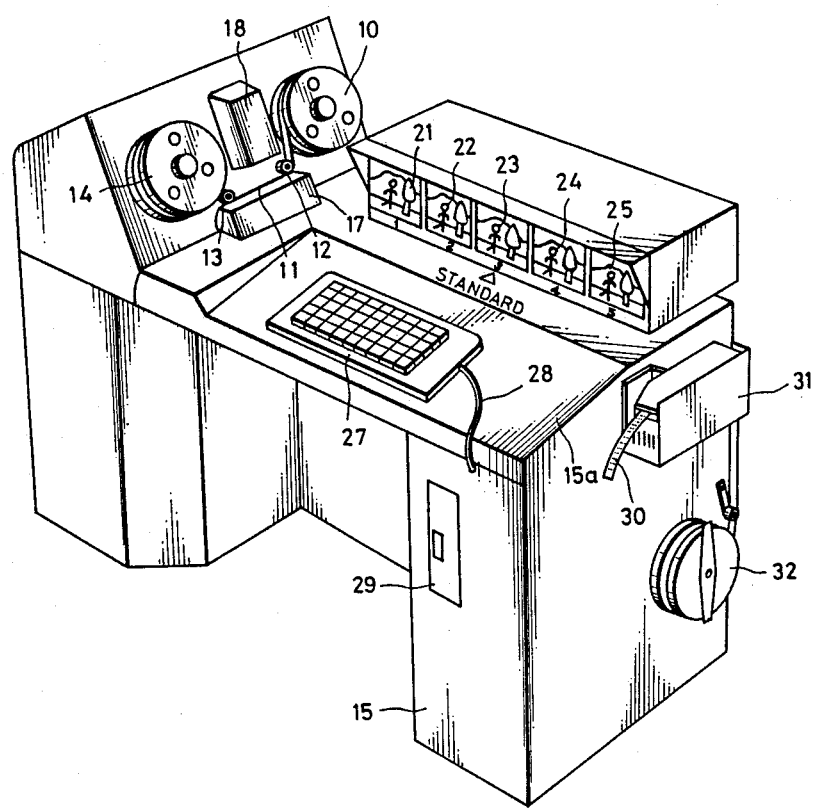
FIG. 1 is a perspective view of a color original inspection apparatus embodying the present invention.

Referring to FIG. 1 showing the outer appearance of the color negative inspection apparatus of the present invention, a color negative film 11 wound about a supply reel 10 is transported to a take-up reel 14 via guide rollers 12 and 13. This take-up reel 14 is rotated by a motor to wind the color negative film 11 one frame after another. The supply reel 10 and take-up reel 14 are mounted detachably on an apparatus main body 15. The color negative film 11 is formed with circular notches (not shown) along at least one edge thereof.

Between the guide rollers 12 and 13, an illumination section 17 and an image reading section 18 are disposed with the color negative film 11 therebetween, a reading position being located between the two sections. The color negative film 11 is stopped when a frame having a notch is detected so that the frame with a notch can correctively be stopped at the reading position to thereby read the color negative image of that frame by the image reading section 18.

Five CRTs 21 to 25 are disposed in a horizontal series on the apparatus main body 15 for image-processing a color negative image read from that frame at the inspection position and displaying five positive color images. The positive color images displayed on the CRTs 21 to 25 are simulated from the image of that frame so as to have different colors and densities similar to those of finished prints obtained by printing the same image on the color original 11 under different printing exposure control conditions with an automatic photo-printing apparatus and developing them with an automatic developing apparatus. A standard CRT 23 at the middle of the five CRTs 21 to 25 displays a color positive image through simulation for a standardized printing exposure control condition, namely a fundamental exposure, to which the color original inspection apparatus is automatically set for a selected one of a plurality of printing exposure control modes which will be described in detail later.

CRTs 21, 22, 24 and 25 on opposite sides of the standard CRT 23 make it easy to perform negative inspection. Each CRT 22, 21 on the left side of the standard CRT 23 displays a color positive image of the color negative image of the color negative film 11 under inspection through simulation for the density correction and/or the color correction under that of a color positive image displayed on the CRT 23, 22 on the right side thereof by a predetermined number of steps. On the other hand, each CRT 24, 25 on the right side of the standard CRT 23 displays a color positive image of the color negative image of the color negative film 11 under inspection through simulation for the density correction and/or the color correction by a predetermined number of steps over that of the color positive image on the CRT 23, 24 on the left side thereof by a predetermined number of steps. The image displayed on each CRT 21 to 25 is corrected in color and density step by step by operating density and color correction keys of a keyboard 27.

One of the five simulated color positive images displayed on the CRTs 21 to 25 is selected as what is to be actually printed by operating a selection key of the keyboard 27. If there is no color positive images on the CRTs 21 to 25 deemed to be proper as a finished print, a correction value is entered through the density correction key of the keyboard 27 so as to display an re-simulated color positive image on the CRT 23. According to this re-simulation of the color positive image on the CRT 23, color positive images are automatically displayed on the remaining CRTs 21, 22, 24 and 25 as simulated for the same correction value respectively.

The number of CRTs is preferably decided based on the easiness of negative inspection and cost performance. Usually five CRTs may suffice. CRTs 21 to 25 may be arranged vertically, or the standard CRT 23 may be disposed at a different position. The keyboard 27 is placed on a table 15a of the apparatus main body 15 and connected, through a cable 28, to a microcomputer in the apparatus main body 15 which is provided with a door 29 and a system floppy controlling the microcomputer.

A puncher 31 is mounted on the right side of the apparatus main body 15, whereby data representative of a correction value to be used in correcting a standardized exposure control condition determined automatically by the automatic photo-printing apparatus, is punched as a coded pattern of perforations on a paper tape 30. After the color negative film 11 wound about the supply reel 10 has been inspected, the puncher 31 is activated upon reception of a command from the keyboard 27 to record the correction data of each frame on the paper tape 30 supplied from a detachable supply reel 32. Instead of the puncher 31, a magnetic recording apparatus and a magnetic floppy may be used to record the correction data on the floppy.

The paper tape 30 is fed to the automatic photo-printing apparatus when the color negative film 11 is printed. The readout correction data of the paper tape 30 is processed using the automatically calculated standardized exposure to determine a corrected exposure.

Figure 2:
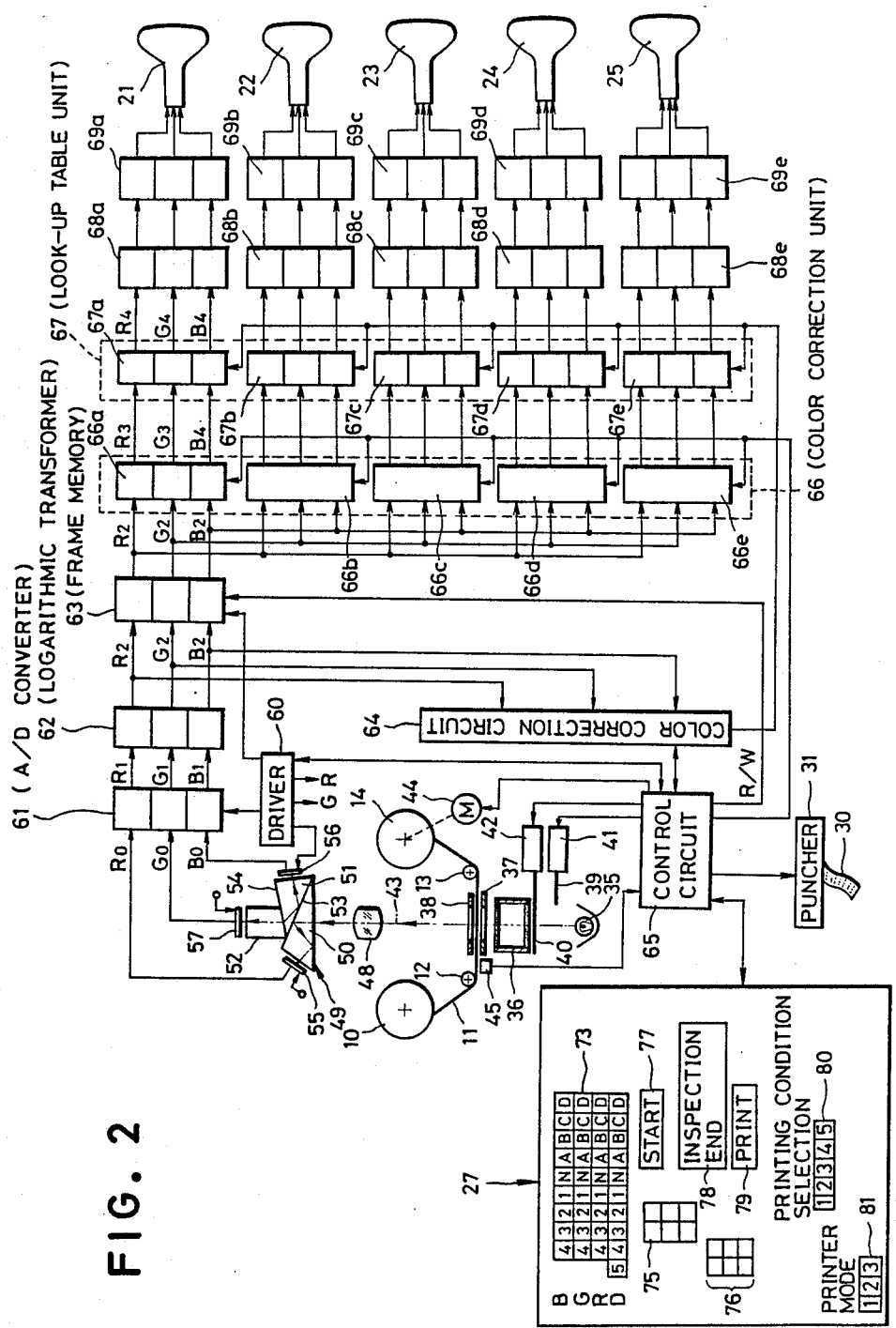
FIG. 2 is a block diagram showing an embodiment of the present invention.

FIG. 2 shows the electrical configuration of the present invention. White light emanating from a white light source 35 is diffused by a mirror box 36 and thereafter is applied to the color negative film 11 in a negative carrier 37. The color negative film 11 is pressed by a mask 38 formed with an opening having the dimension of a frame, thus retaining the shape of a frame in the reading position. Between the white light source 35 and the mirror box 36, a plurality of ND filters are interposed. By inserting one or more ND filters into the optical path 43, the light intensity can be adjusted stepwise by a constant amount. In this embodiment, two ND filters 39 and 40 are shown which are driven by filter drivers 41 and 42 to be inserted in the optical path 43. The take-up reel 14 is driven by a motor 44 and rotated to feed the color negative film 11 one frame after another. During the film feeding, a bar code indicating the film type and recorded on the side portion of the color negative film 11, is read by a bar code reader 45 comprising a plurality of photosensors.

A focusing lens 48 and a three color separation optical system 49 are disposed over the mask 38. The three color separation optical system 49 is comprised of three integrated prisms 50 to 52, a red color dichroic mirror 53 evaporated onto the prism 50, and a blue color dichroic mirror 54 evaporated onto the prism 51. The red color dichroic mirror 53 reflects only red color component of incident light to a red image sensor 55. The blue color dichroic mirror 54 reflects only blue color component of incident light to a blue image sensor 56. Green light is, however, transmitted through the red color dichroic mirror 53 and the blue color dichroic mirror 54 and is applied to a green image sensor 57. The dichroic mirrors 53 and 54 have a color separation characteristic approximately equal to the spectral sensitivity of the color paper used with the automatic photo-printing apparatus. In this embodiment, the image area sensor is used, but a line sensor may be used instead. Furthermore, a stripe filter or the like may be formed before the image area sensor to read a color negative image with a single image area sensor. Furthermore, color video signals outputted from a color television camera may be used to pick up three color image signals (R0, G0, B0) through a color separation circuit.

The image sensors 55 to 57 may be of the CCD type, MOS type and the like, there being focused on the light receiving surface thereof with a monochromatic image obtained through color separation by the three color separation optical system 49. The image sensors 55 to 57 are driven by a driver 60 to photoelectrically convert each pixel of the incident monochromatic image into a time sequential signal (R0, G0, B0), including red R, green G and blue B. The three color signals (R0, G0, B0) are converted by respective A/D converters 61 into digital signals as image data (R1, G1, B1). The obtained image data (R1, G1, B1) is transformed by respective logarithmic transformers 62 into density signals (R2, G2, B2) for three colors which are sent by color to both a frame memory 63 and a color correction circuit 64. The driver 60 sends sampling signals synchronized with the reading of the image sensors 55 to 57 to the A/D converter 61, and synchro signals identifying the position of pixel to the frame memory 63. The read/write operation of this frame memory 63 is controlled by a control circuit 65 comprised by microcomputer.

The frame memory 63 stores the frame image data as the density signals (R2, G2, B2) by color, namely three colorseparated frame image data. The frame image data read out from the frame memory 63 is sent to a color correction unit 66 which is comprised of five color correction circuits 66a to 66e respectively corresponding to the CRTs 21 to 25 to be subjected to masking-processing for color correction, providing color corrected image data (R3, G3, B3). This color correction is made to compensate the difference between the spectral sensitivity of the photographic paper and the spectral transmittance of the color separation optical system 49. This color correction may be omitted if the above-described dichroic mirrors 53 and 54 have performed such a correction. The color correction circuits 66a to 66e are comprised by look-up table memories storing the coefficients for masking processing fomulas and adders. The coefficients are written into the look-up table memories using the control circuit 65.

The color corrected image data (R3, G3, B3) on the under-inspection frame of the color negative film 11 are sent to a look-up table memory unit 67 wherein the image data is subjected to a negative-to-positive conversion and a color and density correction for each of images to be displayed on the CRTs 21 to 25. The look-up table memory unit 67 comprises five look-up table memories 67a to 67e, each of which has three red, green and blue table data written therein for each color positive image. By referring to this table data, signal conversion of the image data (R3, G3, B3) is conducted to thereby correct the color and density of the color image for each positive image displayed on each CRT 21 to 25. These color positive images are different stepwise in color and density from one another.

The image data (R4, G4, B4) for each color positive image is sent to a corresponding one of D/A converters 68a to 68e to be converted into an analog signal. The obtained five image analog signals are then sent to CRT driver circuits 69a to 69e which drive CRTs 21 to 25 respectively to display the color positive images.

The key board 27 includes a color and density correction key arrangement 73, a function key arrangement 75, a color paper type input key arrangement 76, a start key 77, a negative inspection end key 78, a print key 79, a printing condition selection key arrangement 80, and a printing exposure control mode selection key arrangement 81. The color and density correction key arrangement 73 is comprised by red color correction keys, green color correction keys, blue color correction keys, and density correction keys, which are operated when the operator judges that all color positive images displayed on the CRT 21 to 25 are not well-corrected to print actually, based upon his or her observation of all the CRTs. When keys of the correction key arrangement 73 are operated, the table data for each color written in the look-up table memories 67a to 67e coupled to each CRT 21 to 25, are corrected so that each color positive images on each CRT 21 to 25 is corrected over or under in color and/or density by the steps represented by the operated correction keys. In the preferred embodiment, "N" represents that the key step number is zero and no correction is effected, while for example "D" represents that the key step number is minus 4 and correction is effected downwise by the amount corresponding to 4 steps. With a color negative inspection apparatus of the type that a color negative film is checked directly, a cyan correction key, a magenta correction key, and a yellow correction key are used. However, in the present invention, the red, green and blue correction keys are used because a color positive image is displayed and inspected on a CRT.

The function key arrangement 75 is provided for the purpose of simplifying the command operation of the color correction. Thus, the keys are prepared only for such scenes which frequently occur. Upon operating this key, the same color correction function as that obtained when operating a plurality of color and density correction keys, can be performed.

The color paper type input key arrangement 76 is provided for identifying the color paper used with the automatic photoprinting apparatus. In accordance with color paper type information supplied by operating this key, the coefficients of the formula used in the color correction unit 66 are selected among the previously given coefficients.

The start key 77 is operated to start negative inspection to initiate the control circuit 65; the negative inspection end key 78 is operated every time one frame inspection is completed. Upon operation of the negative inspection end key 78, the color negative film 11 is transported to place the next frame in the reading position. The print key 79 is operated when the color negative film 11 has been completely inspected. Upon operation of the print key 79, the puncher 31 is actuated to record the correction data for each frame on the paper tape 30.

The printing exposure condition selection key arrangement 80 is provided for the purpose of selecting an image among the images displayed on the respective CRTs 21 to 25 which is expected to provide a finished print wall-corrected in color and density. The numbers indicated on the respective selection keys correspond to the numbers designating the respective CRTs 21 to 25 shown in FIG. 1. Therefore, for example, the selection key designated by a numeral "1" is operated to select the color positive image displayed on the leftmost CRT 21. If in fact the negative inspection end key 78 is operated without the operation of any key of the selection key arrangement 80, the color positive image displayed on the middle standard CRT 23 is provisionally selected.

The printing exposure control mode selection key arrangement 81 is operated to identify the type of automatic photo-printing apparatus to which the color negative film 11 is fed when making prints therefrom. In general, automatic exposure control systems incorporated in the automatic photo-printing apparatus are different from one another according to manufacturers and/or the types of the automatic photo-printing apparatus. Therefore, color prints of the same negative images possibly differently finished according to exposure control modes of the automatic photo-printing apparatus to be used. For this reason, the color negative inspection apparatus according to the present invention is so adapted as to be applicable to a plurality of different exposure control modes which are selectively used. Consequently, the CRTs 21 to 25 display color positive images each of which is simulated as an image to be printed under an exposure according to a selected exposure control mode.

Figure 3:
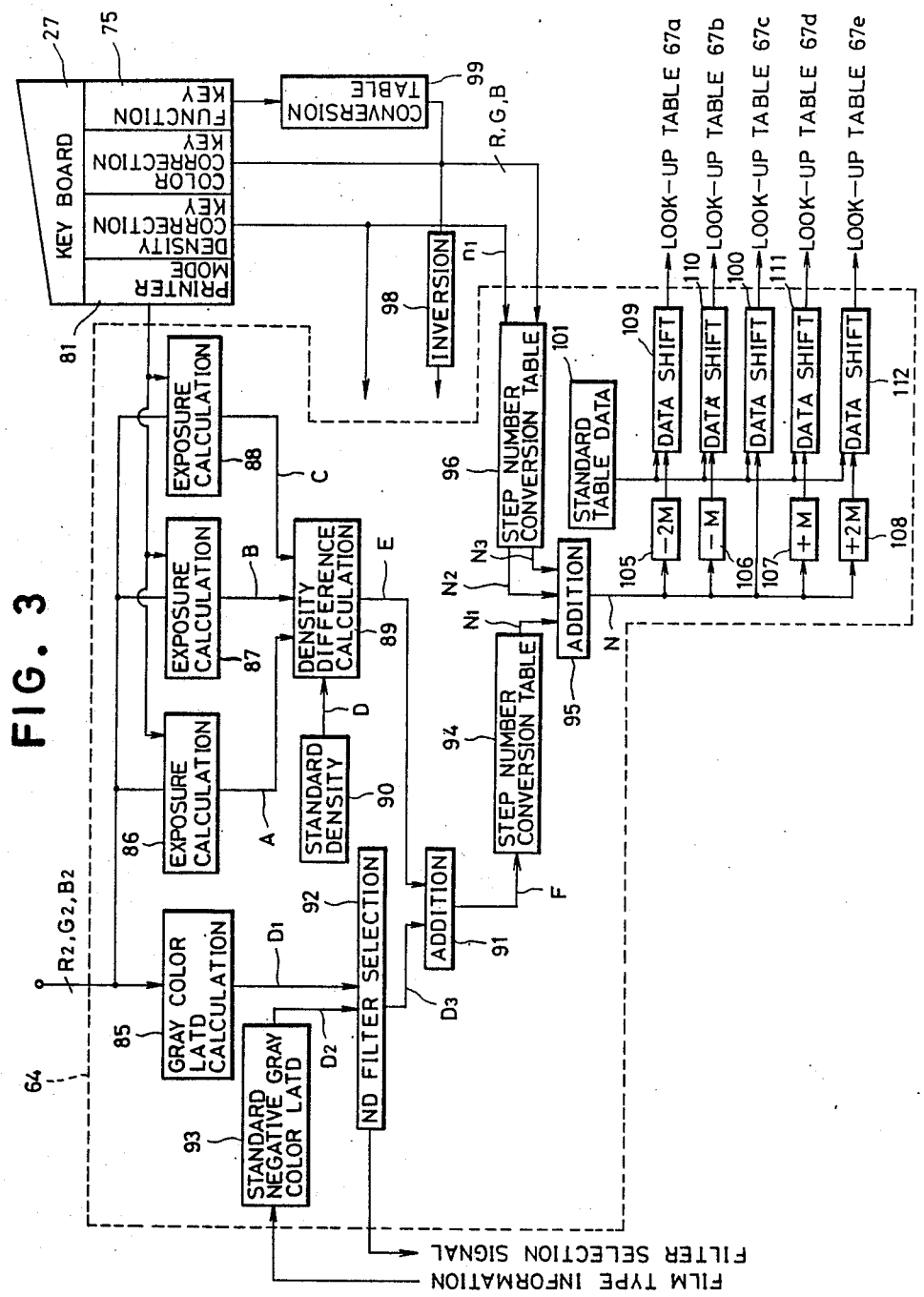
FIG. 3 is a functional block diagram illustrating an example of the color correction circuit.

FIG. 3 is a block diagram illustrating the function of the color correction circuit 64 shown in FIG. 2. The color correction circuit 64 is comprised by a microcomputer. The color correction circuit 64 includes exposure calculation units 86 to 88 provided correspondingly to the types of exposure calculation formulas used in the automatic photo-printing apparatus now in the market. In this embodiment, there are three calculation units 86 to 88 which are selectively actuated by operating the exposure control mode selection key arrangement 81. Each calculation unit 86 to 88 calculates three color density values as exposures by substituting various characteristic values obtained based on the density signals (R2, G2, B2) for each pixel into the exposure caluculation fomula of the exposure control mode selected by one of the exposure control mode selection key arrangement 81.

Specifically, the caluculation unit 86 transforms the image data (R2, G2, B2) for each pixel into antilogarithmic values by color and calculates the arithmetical mean values of the antilogarithmic values for the three colors, which are then logarithmically transformed into LATD values (Dmean). The three color LATD values are outputted as a three color density value A from the calculation unit 86.

The calculations unit 87 calculates three color LATD values (Dmean), three color maximum densities (Dmax), and three color minimum densities (Dmin) as characteristic values on the basis of the image data for the respective pixels. The characteristic values thus calculated are substituted into the following fomula to calculate three color density values B;

$$B = Dmean + \frac{1}{2}(Dmax - Dmin).$$

The calculations unit 88 calculates the maximum densities (Dmax) and minimum densities (Dmin) for the respective pixels which are substituted as the characteristic values into the following fomula to calculate three color density values C;

$$C = \frac{1}{2}(Dmax + Dmin).$$

The three color density values thus obtained by the selected exposure calculation unit, for example the three color density values A (DR1, DG1, DB1), are sent to a density difference calculation unit 89 wherein the three color density values (DR1, DG1, DB1) are compared with standard density values D (which are different by color) to calculate density differences E (DR2, DG2, DB2) which in turn are sent to an adder 91.

The image data (R2, Gs, B2) are also sent to a calculation unit 89 to calculate LATD values for three colors and the arithmetical mean value of the three color LATD values which is a gray color LATD value D1. The gray color LATD value D1 is compared with a gray color LATD value D2 of a standardized negative stored in a memory 93. ND filter selection unit 92 is so adapted as to output a filter selection signal by which is selected an ND filter which makes the gray color LATD value D1 equal to or approximately the same as the gray color LATD value D2 of the standardized negative, and sent a corresponding signal to the control circuit 65. The control circuit 65 actuates either one of filter driving devices 41 and 42 so as to place the selected ND filter into the optical path 43. Simultaneously with the outputting of the filter selection signal, the ND filter selection unit 92 outputs the density value D3 of the selected ND filter which in turn is sent to the adder 91. In the memory 93, various standard gray color LATD values D3 of different types of standardized negatives are stored and read out according to the types of negatives read by the bar code reader 45.

The adder 91 adds together the three color density values E (DR2, DG2, DB2) and the density value D3 of the selected ND filter by color to caluculate three color density values F (DR3, DG3, DB3) using the following equations:

$$DR3 = DR2 + D3$$

$$DG3 = DG2 + D3$$

$$DB3 = DB2 + D3$$

The three color density values F are sent to a step number conversion table 94 wherein the cooler density values are converted into the gradation step numbers by which the table data in the look-up table memories 67a to 67e are shifted. Signals N1 (NR1, NG1, NB1) representative of the step number are sent to an adder 95. In converting the color density signals into the step number, since it has been previously determined that the table data are to be shifted by "50" in units of gradation step numbers for the case of a density difference of "0.3" for example, the signal N1 is obtained by dividing the density difference by "0.3" and multiplying the result by "50".

When the density correction key of the keyboard 27 is operated, the signal n1 representative of the key step number is sent to another step number conversion table 96. When the color correction key of the keyboard 27 is operated, the key step number of the operated color correction key is sent to the step number conversion table 96 and an inverter 98. Since the function key 75 of the keyboard 27 is operated instead of the three color correction keys, after converting the input of the function key 75 into a signal representing the color correction key step number by the conversion table 99, the key step number is sent to the step number conversion table 96 and the inverter 98.

The step number conversion table 96 outputs signal N2 corresponding to the operated density correction key step number n1 and signals N3 (NR3, NG3, NB3) corresponding to the operated color keystep number and sends them to the adder 95. For instance, assuming that the step number per one key step of the density correction key is "16", upon operating the density correction key whose step number is "3", the step number conversion table 96 outputs signal N2 representative of the step number of "48". Assuming that the step number per one key step of the color correction key is "8", signals N3 become (0, −8, 16) in the case of "N" of the red correction key, "A" of the green correction key and "2" of the blue correction key. The step number per one key step is determined based on experiments.

The adder 95 calculates the step numbers N (NR, NG, NB) using the following formulas and sends the results to a data shift circuit 100:

$$NR = NR1 + N2 + NR3$$

$$NG = NG1 + N2 + NG3$$

$$NB = NB1 + N2 + NB3$$

Figure 4:
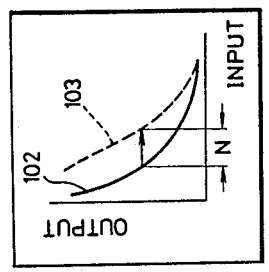
FIG. 4 is a graphical representation explaining the shifting of step number.

As is shown in FIG. 4, the data shift circuit 100 shifts each standard table datum 102 stored in an standard table data memory 101 by the step numbers N in gradation to a table data 103. Thereafter, the table data 103 shifted for each color is written into the look-up table memory 67c. The standard table data 102 which is stored for each color has been experimentarily predetermined in such a way that the density of a print from a color negative image with a standard density D becomes equal to the brightness of the color positive image displayed on the CRT. In this case, if the standard table data 102 has been written in each look-up table memory 67a to 67e and is provided with a shift circuit at the input side thereof, the input signal to the shift circuit may be shifted by N in units of step numbers. As a result, the write operation into the look-up table at that time is not needed, thus resulting in a high speed color correction process.

On the CRT 23, there is displayed a color positive image through simulation either for the standardized printing exposure condition under which an finished print is made by an automatic photo-printing apparatus provided with an automatic exposure control system or for the color and density correction effected by the operation of the keyboard 27. For displaying corrected color negative images on the CRTs 21, 22, 23 and 24 through simulation for the density correction based on the color positive image displayed on the CRT 23, there are subtraction circuits 105 and 106 and addition circuits 107 and 108 for shifting a printing condition stepwise for ecah CRT by the operation of the density correction key. The subtraction circuit 105 subtracts from the step number N corresponding to the standardized printing exposure the step number 2M which is two times of the step number per one key step of the density correction key. In the same way, the subtraction circuit 106 subtracts from the step number N for the standardized printing condition the step number 1M equal to the step number per one key step of the density correction key. In contrast with this, the addition circuits 107 and 108 add to the step number N for the standardized printing exposure the step numbers 1M ad 2M, respectively.

The resulting step numbers calculated in the subtraction and the addition circuits 105 to 108 are then sent to data shift circuits 109 to 112, respectively, to shift the standard table data read out from the memory 101 for each color correspondingly. The shifted standard table data is written into the respective look-up tables 67a, 67b, 67d and 67e.

Figure 5:
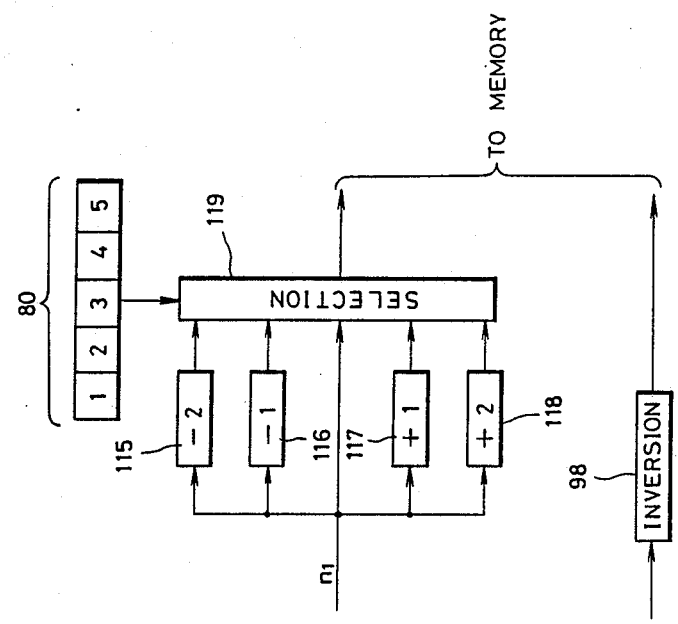
FIG. 5 is a block diagram illustrating an example of the calculation circuit for correction data.

Referring to FIG. 5 showing a block diagram illustrating the function of the calculation circuit for correction data, the inverter 98 inverts the signs of the input of the color correction key of the keyboard 27 to convert into the key step numbers of cyan correction key, magenta correction key or yellow correction key. Assuming that the operated red correction key is "N", the green correction key is "A", and the blue correction key is "2". The color correction amount (the key step number of the cyan, magenta, and yellow correction keys) becomes (N, 1, B), and the data representative of this is sent to the puncher 31.

For the reason of displaying color positive images automatically corrected stepwise in density through the density correction key on the CRTs 21, 22, 24 and 25 while displaying a color positive image through simulation for standard printing exposure, there are subtraction circuits 115 and 116 and addition circuits 117 and 118 for caluculating the number of steps of which the density correction key has been operated for each color positive image displayed on each CRT 21, 22, 24 and 25. Specifically, the subtraction circuit 115 subtracts the step number "2" of the density correction key from the number "n1" of corrected steps effected by the density correction key. The subtraction circuit 116 subtracts the step number "1" of the density correction key. In contrast with this, the addition circuit 117 adds the step number "1" of the density correction key to the number "n1" of corrected steps effected by the density correction key. The addition circuit 118 adds the step number "2" of the density correction key. The resulting five step numbers thus calculated are sent to a selection circuit 119 wherein one of the step numbers is selected by a printing condition selection key arrangement 80 to be sent as the density correction data to a memory means.

The memory means temporarily stores therein the density correction data for each color (the step numbers of the operated cyan correction key, magenta correction key, and yellow correction key, respectively) and reads out the density correction data for each other to send the same to the puncher 31 when the print key 79 is operated. The puncher 31 punches these correction data as coded perforations on the paper tape 30. If there is a correction key in the puncher 31, the data entered through the correction key is also punched on the paper tape 30.

In the operation of the above-described embodiment, a color negative film 11 wound in a roll about the supply reel 10 is mounted on the apparatus main body 15. Upon turning on the power supply for the apparatus, the control circuit 65 shown in FIG. 2 clears the data in the frame memory 63, color correction unit 66, and look-up table unit 67 as well as causes the operation parts to be operable. After one of the keys of the printing exposure control mode selection key arrangement 81 has been operated according to the automatic photo-printing apparatus to be used, the paper type input key of the keyboard 27 is operated to input the information on the type of color photographic paper to be used for the automatic photo-printing apparatus. The control circuit 65 selects the coefficients of a formula in accordance with the color photographic paper type information and writes them into the color correction unit 66.

Upon operating the start key 77, the control circuit 65 drives the motor 44 to rotate the take-up reel 14. When the frame with a notch comes to the reading position, the motor 44 is stopped. The image sensors 55 to 57 start reading the image at a predetermined period from the time the power was turned on, and carry out a three color separation light measurement when the first frame of the color original 11 reaches the reading position. Specifically, the color negative image on the first frame is color-separated into red, green, blue monochromatic images by the three color separation optical system 49, and each monochromatic image is received by each image sensor 55 to 57 which converts each pixel of the incident monochromatic image into a time sequential signal and output it. The red signal R0, green signal G0, and blue signal B0 outputted from the image sensors 55 to 57 are respectively converted into digital signals by the A/D converter 61 and then transformed into the image data (R2, G2, B2) by the logarithmic transformer 62.

The image data (R2, G2, B2) are sent to one of the exposure calculation units 86 to 88 of the color correction circuit 64 shown in FIG. 3, which one is selected through the printing exposure control mode selection key arrangement 81 and wherein each color exposure is calculated as each color density with which a standard print will be finished. For instance, if the automatic photo-printing apparatus to be used is of the type which controls exposure based on LATD values, the exposure caluculation unit 86 is selected to caluculate a LATD value for each color which in turn is sent as a color density value A to the density difference calculation unit 89.

The image data (R2, G2, B2) are also sent to the gray color LATD calculation unit 85 to calculate the gray color LATD value D1. The bar code reader 45 mounted before the reading position reads the bar code recorded on the side portion of the color negative film 11. The control circuit 65 decodes the bar code to output the film type information and sends it to the memory 93 for storing the standard negative gray color LATD value. The memory 89 outputs the gray color LATD values D2 of the standard negative in accordance with the film type information. The ND filter selection unit 88 outputs a filter selection signal by which selected is an ND filter which makes the gray color LATD value D1 of the frame being inspected equal to or approximately the same as the gray color LATD value D2 of the standard negative, and sends a corresponding signal to the control circuit 65. The control circuit 65 drives the filter driver such as 41 corresponding to the selected ND filter to insert the ND filter 39 into the optical path 43. The ND filter then adjusts the quantity of incident light to each image sensor 55 to 57. After inserting the ND filter 39 into the optical path 43, the control circuit 65 starts writing into the memory unit 63 at the timings synchronizing with the reading of the driver 60. The frame memory 66a is selected to write the image data (R2, G2, B2) of each pixel of the first frame measured under the condition that the ND filter 39 is inserted.

The density difference calculation unit 89 calculates the differences between the three color density values from the one of the exposure caluculation units 86 to 88 selected in accordance with the automatic photo-printing apparatus to be used and the standardized density value (which is the same for three colors) and sends them to the additionn circuit 91. The addition circuit 91 adds each difference to the filter density D3 (which is the same for three colors) by color and outputs the resultant three color density values F.

The three color density values F are converted into the step number N1 by the step number conversion table 94, which number is used for shifting the standard table data and sent to the adder 95. Since any key of the keyboard 27 is usually not operated, the step number N1 outputted from the step number conversion table 94 is sent to the data shift circuit 100 to shift the standardized table data for each color stored in the memory 101 by the step number N1 (which is different by color); the shifted table data for each color being stored in the look-up table memory 67c. Namely, stored in the look-up table memory 67c are three color gradation curves 103 to which the corresponding color gradation curves 102 (which are different from one another) representative of the color paper to be used are shifted by the same steps in gradation as the step number N1.

For the purpose of displaying four color positive images different in density from one another by one key step of the density correction key and from the image on the CRT 23 stepwise, the step number N1 is sent to the respective subtraction and addition circuits 105 to 108. The resulting step numbers are respectively sent to the data shift circuits 109 to 112 to shift the standardized table data for each color by the resulting step numbers. The shifted table data for each color is written in the corresponding look-up table memory 67a to 67e.

The image data (R2, G2, B2) written in the frame memory 63 separately by color are subjected to the correction of the difference between the spectral sensitivity of the color photographic paper and the spectral transmittance of the three color separation optical system 49 in the color correction circuit 66, and thereafter the corrected data are distributed to the look-up table memories 67a to 67e. The look-up table memories 67a to 67e effect color correction, density correction and negative-positive inversion. The image data (R4, G4, B4) derived from the look-up table memories 67a to 67e are, after being converted into analog signals by D/A converter 68a to 68e, respectively, sent to corresponding CRT driving circuits 70a to 70e so as to display a color positive image simulated for standardized printing condition on the center CRT 23 and, on the remaining CRTs 21, 22, 24 and 25, four different color positive images simulated for density correction one or two steps under or over the density of the standardized color positive image on the standard CRT 23.

On the CRTs 21 to 25, five color positive images are displayed through simulation for the density correction in five ways. Operator can select one of the five color positive images which is such as to produce a proper finished print while observing the five color positive images. For instance, if the image displayed on the CRT 22 is desirable, the key with a numeral "2" of the printing condition selection key arrangement 80 should be operated. In this case, the selection circuit 119 selects the subtraction circuit 116 so as to retrieve a printing exposure condition under which a print will be finished one step under in density in comparison with a print finished under the standardized printing exposure condition.

If in fact all the five color positive images on the CRTs 21 to 25 are such as not to produce any proper finished print, the correction keys (the density correction key, the color correction key and the function key) are occasionally all or selectively operated. If a density correction key is operated, the step number conversion table 96 outputs the step number N2 corresponding to the operated density correction key. If a color correction key for red, green or blue is operated, the step number conversion table 96 outputs the step number N3. And if the function key 75 is operated, the step number is sent to the step number conversion table 96 after having been converted into the step number of the color correction key previously correspondingly designated.

As is described above, if when the density correction and color correction are effected manually through the correction keys, a calculation is carried out by the addition circuit 95 to obtain the gradation step number N. In accordance with this new step number N, the standardized table data are shifted and are written in the look-up table memory 67c. Simultaneously, the loop-up table memories 67a, 67b, 67d and 67e are written by different table data shifted one or two steps over or under the table data written in the look-up table memory 67c.

These renewed table data correct the image data so as to display color and/or density corrected positive images on the CRTs 21 to 25. Observing the corrected color positive images displayed on the CRTs 21 to 25, the operator checks which is corrected properly to be printed. If in fact there is a color positive image properly corrected, the operator designates the properly corrected color positive image by operating a corresponding key of the printing condition selection key arrangement 80. However, if there is color positive image properly corrected, then re-correction is made in the same way as the previous correction by operating the correction keys of the keyboard 27. After completion of the first frame negative inspection and operating the negative inspection end key 78, the correction data representative of the density, color, correction mode are sent to the memory to be stored therein.

upon the operation of the negative inspection end key 78, the motor 44 is re-started into rotation to place the next frame of the negative 11 to be inspected in the inspection position and thereafter the color negative image of the new frame is read to display it on the CRTs 21 to 25 in just the same way as the color negative image of the previous frame. The operator specifies, after effecting necessary correction if there is no proper color positive images, one of the five color positive images displayed on the CRTs 21 to 25 which is suitable to be actually printed in order to determine printing condition proper to the new frame of color negative image. The same operation is repeated for all the frames of the negative film 11.

When negative inspection for all frames of the film wound about the supply reel 10 has been completed, the print key 79 is operated. Then, the correction data for each frame stored in the memory of the puncher 31 is recorded on the paper tape 30 in the form of punching code. This paper tape 30 is fed to the automatic photo-printing apparatus when the inspected color negative film is to be printed on a color paper. With this automatic photo-printing apparatus, the correction data read from the paper tape 30 and the exposure control data read outputted from the automatic exposure control system are used for control of the exposure amount of red, green and blue light, so that the same image as the color image displayed on the specified one of the CRTs 21 to 25 is printed on the color paper in the form of a latent image.

Figure 6:
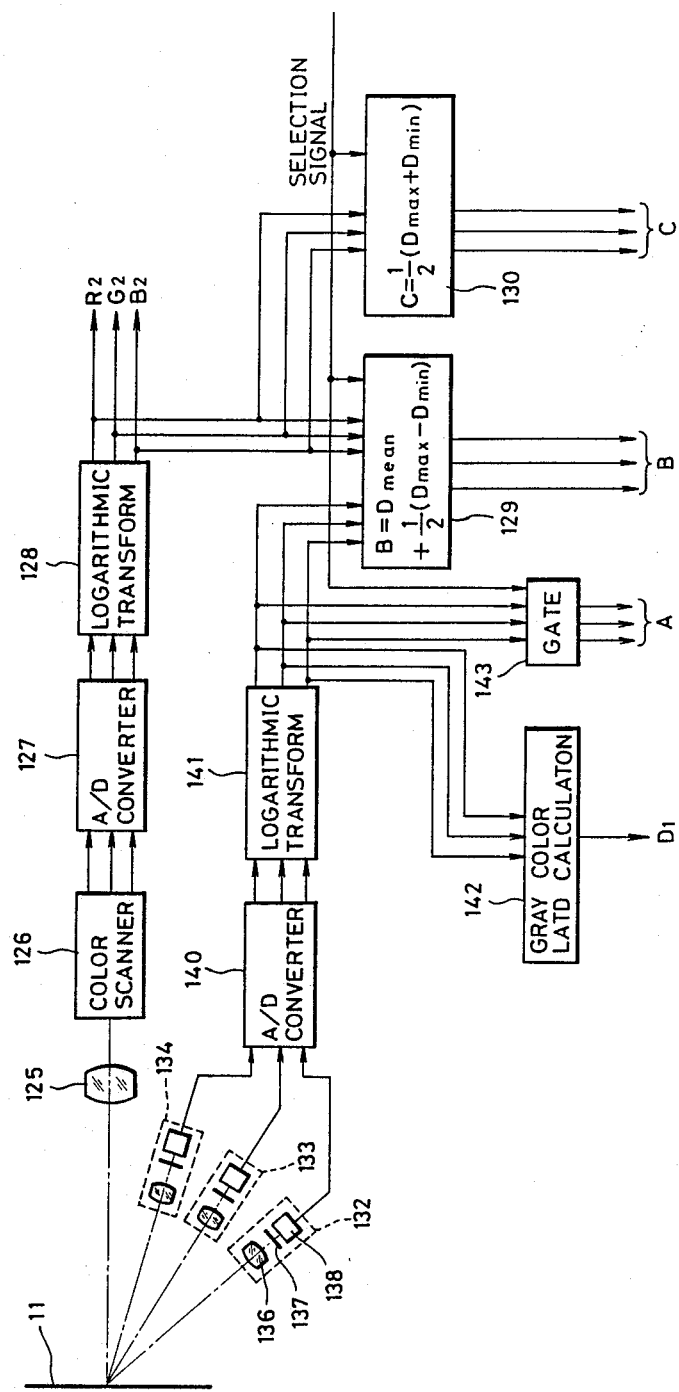
FIG. 6 is a block diagram showing an embodiment of the present invention wherein a sensor is used exclusively for each color to measure a LATD.

Referring now to FIG. 6 showing another embodiment of the present invention wherein sensors each of which is exclusive to a single color are provided, a color scanner 126 scans an negative image of the negative film 11 through a focusing lens 125 so as to output three color signals for each pixel in a three color separation method. The three color signals are, after having been converted into digital signals by A/D converter 127, transformed to three color density signals by a logarithmic transformer 128 and thereafter sent to both exposure caluculation units 129 and 130.

Three exclusive sensors 132 to 134 are disposed one for each color; namely red, green, and blue, to measure the color negative image of the negative film 11 in a LATD light measuring method. As these sensors 132 to 134 have are substantially the same structure excepting being provided with different color filters, the following description will be made in respect to the sensor 132 exclusively used for measuring red light. The sensor 132 comprises focusing lens 136, red filter 137, light receiving element such as a photo-diode and so forth. These sensors 132 to 134 measure over the whole image area, or otherwise a part (apploximately 50 to 80%) of the whole image area excluding the marginal part thereof.

The color signals outputted from the respective sensors 132 to 134 are, after having been converted into digital signals by A/D converter 140, transformed to LATDs for each color by a logarithmic transformer 141. Each LATD is sent to a gray color LATD calculation unit 142, a gate 143, and an exposure calculation unit 129, simultaneously. The gate 143 is used in association with an automatic photo-printing apparatus of the type which controls exposure using LATDs, and controlled to open and close by the operation of the printing exposure control mode selection key 81. The exposure calculation unit 129 retrieves the maximum and minimum densities from the image data of each pixel measured by the color scanner 126 and calculates three color density values B as exposures using the retrieved maximum and minimum densities and the LATDs outputted from the logarithmic transformer 141. On the other hand, the exposure calculation unit 130 retrieves the maximum and minimum densities from the image data measured by the color scanner 126, and based on which calculates three color density values C.

Although, in the above-described embodiments, a plurality of CRTs are used to display five different color positive images through simulation for the color correction and density correction, it is permissible to use a single CRT which can display five different color positive images thereon at a time. Furthermore, it may be advantageous to use the negative inspection apparatus of the present invention in combination with automatic photo-printing apparatus to inspect color negatives immediately before actually printing.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A color negative inspection apparatus comprising:
   means for providing a plurality of different printing exposure control modes, each defining a standardized printing exposure condition;
   means for reading a color negative image on a single frame of a color negative film;
   memory means for storing image data of said color negative image read by said reading means;
   means for selecting any one of said plurality of different printing exposure control modes; and means for displaying at least one simulated color positive image based on said image data read out from said memory means and a standardized printing exposure condition according to said selected one of said plurality of different printing exposure control modes.

2. A color negative inspection apparatus as defined in claim 1, wherein said display means displays a plurality of simulated color positive images based on said image data read out from said means and color and density correction data, said plurality of color positive images being different in at least color and density from one another.

3. A color negative inspection apparatus as defined in claim 2, wherein said display means includes at least one CRT which displays said plurality of color positive images thereon.

4. A color negative inspection apparatus as defined in claim 2, wherein said display means includes a plurality of CRTs which display said plurality of color positive images one on each one of said plurality of CRTs.

5. A color negative inspection apparatus as defined in claim 2, wherein one of said plurality of displayed simulated color positive image corresponds to a color positive image according to a standardized printing condition specified by said selected printing exposure control mode and the remaining of said plurality of displayed simulated color positive images correspond to color positive images automatically corrected for color and density stepwise over or under respective to said one of said plurality of color positive images.

6. A color negative inspection apparatus as defined in claim 5, wherein said one of said plurality of color positive images is manually simulated for at least one of color and density corrections.

7. A color negative inspection apparatus comprising:
means for prividing a plurality of different printing exposure control modes each of which defines a standardized printing exposure condition;
means for reading a color negative image of a single from of a color negative film;
means for selecting any one of said plurality of printing exposure control modes;
means for displaying a plurality of different simulated color positive images based on said image data read out from said memory means, one of which corresponds to a positive image according to a standardized printing condition defined by said selected one of said plurality of printing exposure control modes and the remaining through automatic simulation for at least one of color density corrections different stepwise over or under in respect to said one of said plurality of color positive images; and
means for manually correcting said one of said plurality of color positive images in color and density.

8. A color negative inspection apparatus as defined in claim 7, wherein said display means comprises a single CRT.

9. A color negative inspection apparatus as defined in claim 7, wherein said display means comprises CRTs as many as said plurality of color positive images.

10. A color negative inspection apparatus as defined in claim 7, wherein said manually correcting means is a key arrangement including at least color correction keys and density correction keys, each key being capable of changing said standardized printing exposure condition stepwise.

* * * * *